(12) United States Patent  (10) Patent No.: US 7,604,097 B2
Younggren et al.  (45) Date of Patent: Oct. 20, 2009

(54) WET BRAKE SYSTEM

(75) Inventors: Bruce H. Younggren, Bemidji, MN (US); Brian T. Wolf, Bemidji, MN (US); Jeremy R. Eichenberger, Warroad, MN (US)

(73) Assignee: TEAM Industries, Inc., Bagley, MN (US)

( * ) Notice: Subject to any disclaimer, the term of this patent is extended or adjusted under 35 U.S.C. 154(b) by 264 days.

(21) Appl. No.: 11/495,145

(22) Filed: Jul. 28, 2006

(65) Prior Publication Data

US 2008/0023275 A1  Jan. 31, 2008

(51) Int. Cl.
*F16D 55/02* (2006.01)
(52) U.S. Cl. ..................................... 188/71.6
(58) Field of Classification Search ............... 188/71.5, 188/71.6, 72.7
See application file for complete search history.

(56) References Cited

U.S. PATENT DOCUMENTS

| | | | |
|---|---|---|---|
| 3,674,118 A | 7/1972 | Klaue | |
| 3,956,945 A | 5/1976 | Eggleton et al. | |
| 4,016,957 A | 4/1977 | Osujo et al. | |
| 4,037,694 A * | 7/1977 | Keese | 188/71.5 |
| 4,169,523 A | 10/1979 | Malinowski et al. | |
| 4,294,334 A | 10/1981 | Shinoda et al. | |
| 4,407,382 A * | 10/1983 | Dziuba et al. | 188/71.5 |
| 4,489,801 A | 12/1984 | Marier | |
| 4,582,175 A | 4/1986 | Yanai | |
| 4,856,373 A | 8/1989 | Washizawa | |
| 6,189,669 B1 * | 2/2001 | Kremer et al. | 188/71.6 |
| 6,293,890 B1 | 9/2001 | Kaku | |
| 6,345,712 B1 * | 2/2002 | Dewald et al. | 188/71.6 |
| 6,354,421 B1 * | 3/2002 | Mochizuki et al. | 188/71.5 |
| 6,401,857 B1 | 6/2002 | Hisada et al. | |
| 6,805,217 B2 | 10/2004 | Kinouchi et al. | |
| 6,968,934 B2 * | 11/2005 | Yamamura et al. | 192/70.12 |
| 2004/0040776 A1 | 3/2004 | Takagi | |
| 2008/0017434 A1 | 1/2008 | Harper et al. | |

* cited by examiner

*Primary Examiner*—Melanie Torres
(74) *Attorney, Agent, or Firm*—IPLM Group, P.A.

(57) ABSTRACT

A brake system (100) utilizes a ring gear assembly (13). The ring gear assembly (13) includes a ring gear (13G) that rotates in the oil in the oil sump formed by the housing (101). The ring gear picks up oil as it rotates and as the oil is carried with to the top of the ring gear it falls by gravity into an accumulation cavity (3C). The oil then travels through an aperture (13A) and is then available for use by the reaction and friction plates (8 and 9) for cooling.

8 Claims, 7 Drawing Sheets

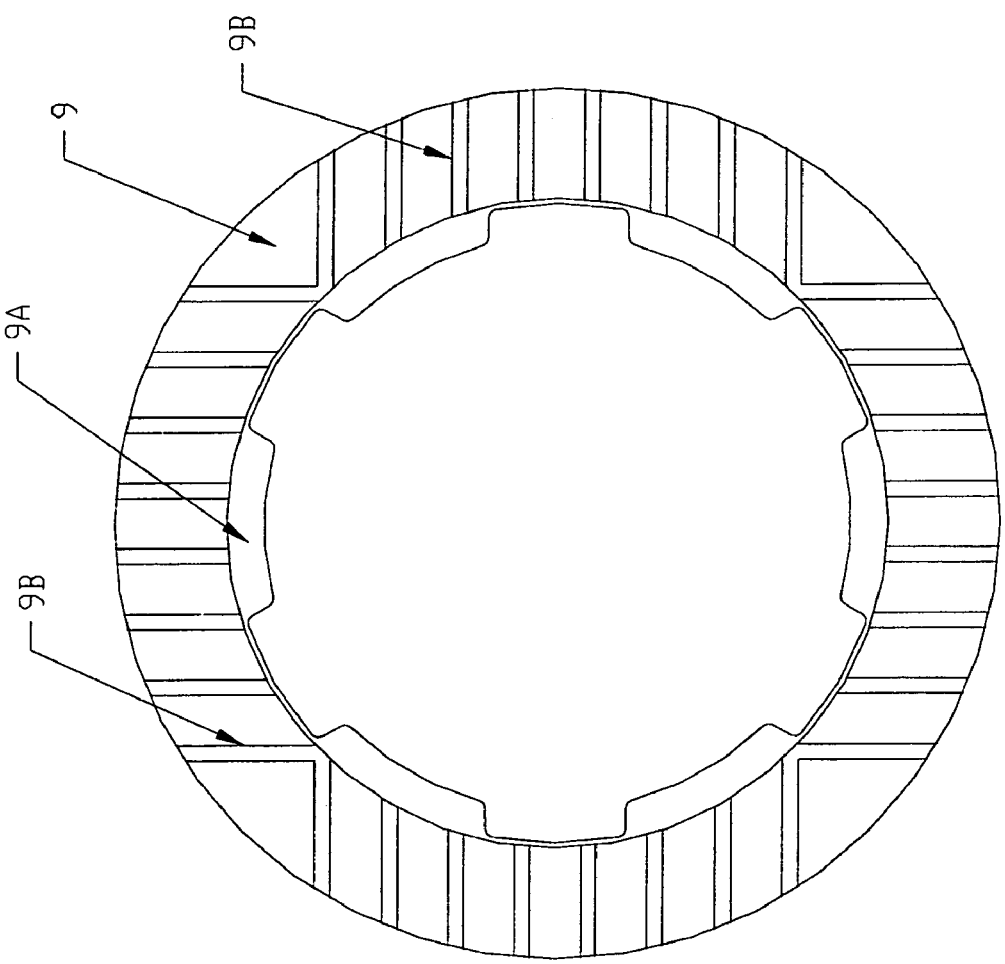

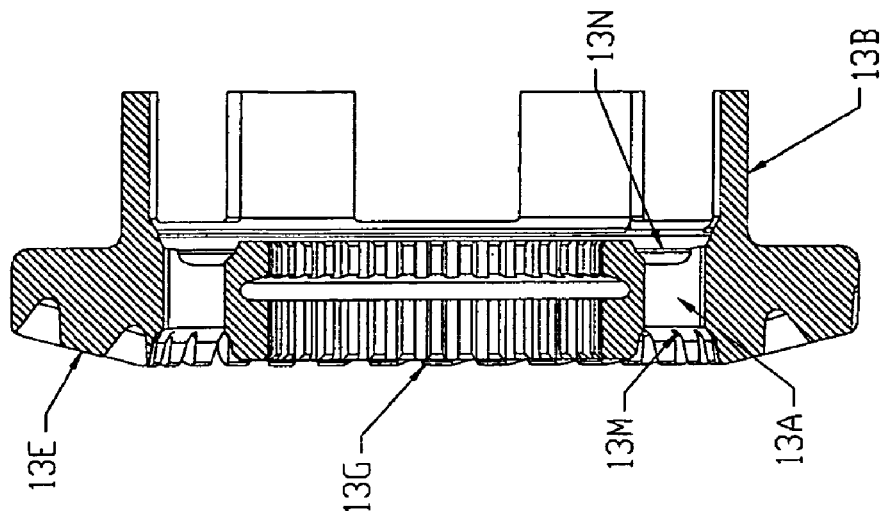
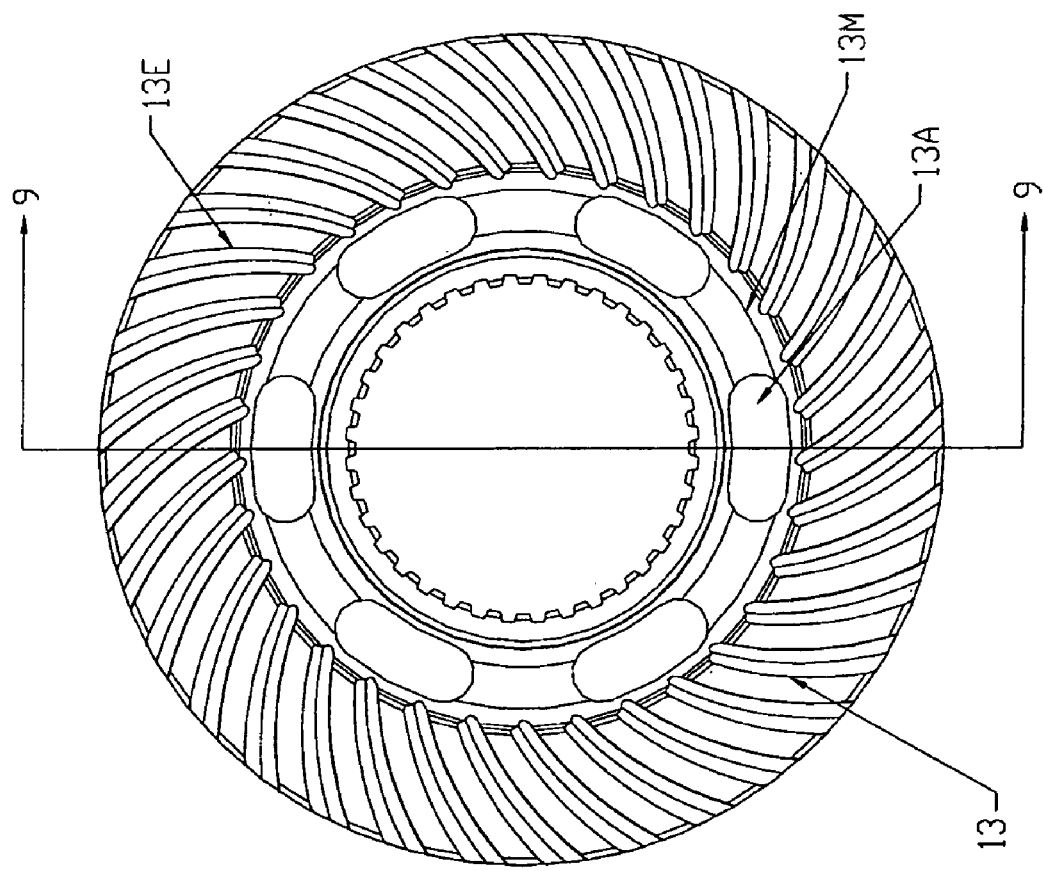

WET BRAKE SYSTEM

BACKGROUND OF THE INVENTION

1. Field of the Invention

This invention relates generally to a brake system and more particularly to a wet brake system which utilizes a ring gear to bring oil to a brake pack.

2. Description of the Prior Art

Wet brakes need oil to flow through the brake pack to remove the heat generated during braking operations. Typically, this is done with a pump in order to more effectively cool the brake pack. The present invention provides for the use of a ring gear to bring the oil from the oil sump to the brake pack.

SUMMARY OF THE INVENTION

In one embodiment of the invention is a brake system for use in a vehicle. The brake system includes a housing defining a cavity. The bottom of the cavity forms a sump for oil. A ring gear, having an outer circumference, is rotatably mounted in the housing. The ring gear has a first side and a second side. A member forms an oil accumulation cavity. The member is proximate the first side of the ring gear and extending outward, away from the second side. The member has an opening proximate its top, the opening is for receiving oil from the ring gear as the ring gear rotates in oil. The ring gear has an aperture from the first side to the second side. The aperture is in fluid communication with the oil accumulation cavity. At least one reaction plate and one friction plate are positioned proximate the second side of the gear ring. The plates have a central bore. The aperture is in fluid communication with the central bores.

In another embodiment the invention is a brake system for use in a vehicle. The brake system includes a housing defining a cavity. The bottom of the cavity forms a sump for oil. A ring gear, having an outer circumference, is rotatably mounted in the housing. A member forms an oil accumulation cavity. The member has an opening proximate its top. The opening is for receiving oil from the ring gear as the ring gear rotates in oil. At least one reaction plate and one friction plate are positioned proximate the ring gear. The plates have a central bore. The oil accumulation cavity is in fluid communication with the central bores.

BRIEF DESCRIPTION OF THE DRAWINGS

FIG. 6 is a front elevational view of a friction plate shown in FIG. 1;

FIG. 7 is a side elevational view of the friction plate shown in FIG. 6;

FIG. 8 is a front elevational view of the ring gear shown in FIG. 1; and

FIG. 9 is a cross-sectional view of the ring gear shown in FIG. 8, taken generally along the lines 9-9.

DETAILED DESCRIPTION OF A PREFERRED EMBODIMENT

Figure 1:
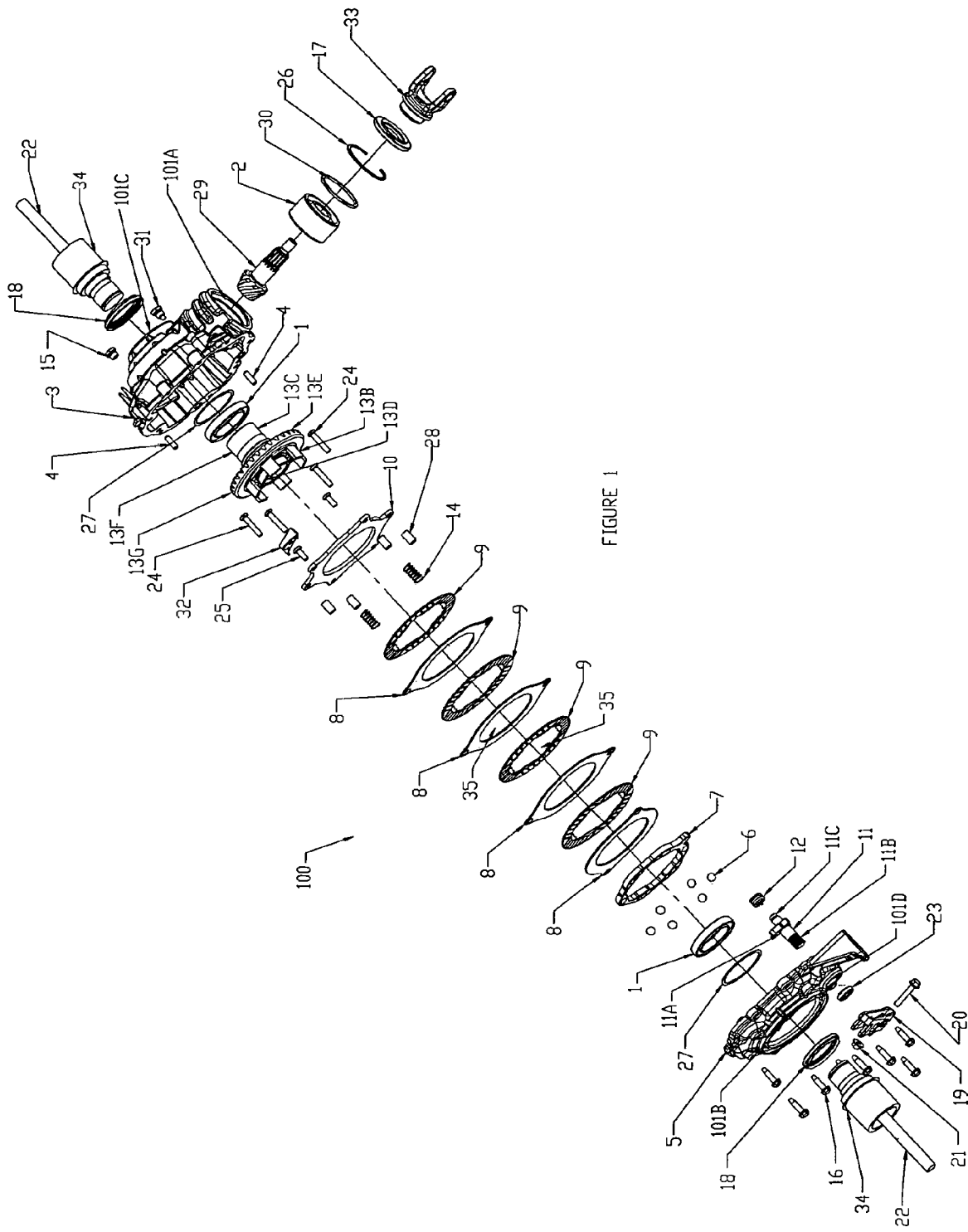
FIG. 1 is an exploded perspective view of the wet brake system of the present invention.

Referring to the drawing, wherein like numerals represent like parts throughout the several views, there is generally disclosed at 100 a brake system. The brake system 100 includes a housing 101 that includes a case 3 operatively connected to a cover 5, by suitable means such as screws 16. Pins 4 are used to locate the case 3 and cover 5. The housing 101 has a first opening 101A. There, a pinion 29 is mounted in a ball bearing 2 that is positioned in the first opening 101A. This bearing is held in place by a washer 30 and retaining ring 26. A U-joint 33 is operatively connected to the pinion 29 and a seal 17 seals the system 100 between the OD and the U-joint. The housing 101 has a second opening 101B into which a CV joint 34 is mounted. A seal 18 is positioned around the CV joint 34 and seals the opening 101B. Similarly, another CV joint 34 is mounted in a third opening 101C and again a seal 18 seals the opening 101C. Plug 15 is an oil fill plug and plug 31 is a drain.

Drive shafts 22 are operatively connected to each of the CV joints 34 for driving the right and left wheels of a vehicle. A fourth opening 101D is formed in the housing and a brake shaft 11 is rotatably mounted therein. A seal 23 is positioned over the shaft 11 and seals the opening 101D. A bell crank 19 is rigidly attached to the first end 11B of the shaft 11. The bell crank 19 is rigidly clamped to the shaft 11 via a screw 20 and a nut 21. The second end 11C of the shaft 11 is rotatably mounted in a suitable bore in the case 3. A cable (not shown) is attached via the slots 19A in bell crank 19. A sheath for the cable goes through a hole 5A in the cover 5. This cable is in turn connected to a hand lever or foot lever to activate the brake. The brake shaft has rigidly attached thereto a lever 11A.

A ball ramp 7 has a plurality of helical tracks 7A formed therein. These tracks 7A are at relatively the same diameter as the ball pockets formed in the cover 5. Ball bearings 6 sit in the pockets formed in the cover 5 on one side and sit in the helical tracks 7A in the ball ramp 7 on the other side. Attached to the ball ramp 7 is a lever 7B. As the cable is pulled from the hand lever or foot lever the crank bell 19 rotates. Since the bell crank is rigidly attached to the crank shaft, the shaft 11 also rotates. This in turn causes the lever 11A to rotate and the lever 11A contacts the lever 7B and rotates the ball ramp 7. This moves the ball ramp 7 away from the cover 5. A spring 12 is operatively connected to the shaft 11 to return it to position after pressure is released from the cable. The movement of the ball ramp will compress the brake pack, as will be more fully described hereafter. It is understood that other mechanism for compressing the brake pack may also be utilized such as devices using cam faces. Also, it is understood that the foregoing is just an exemplary version of a brake system and the present invention may be utilized with other suitable designs.

Figure 3:
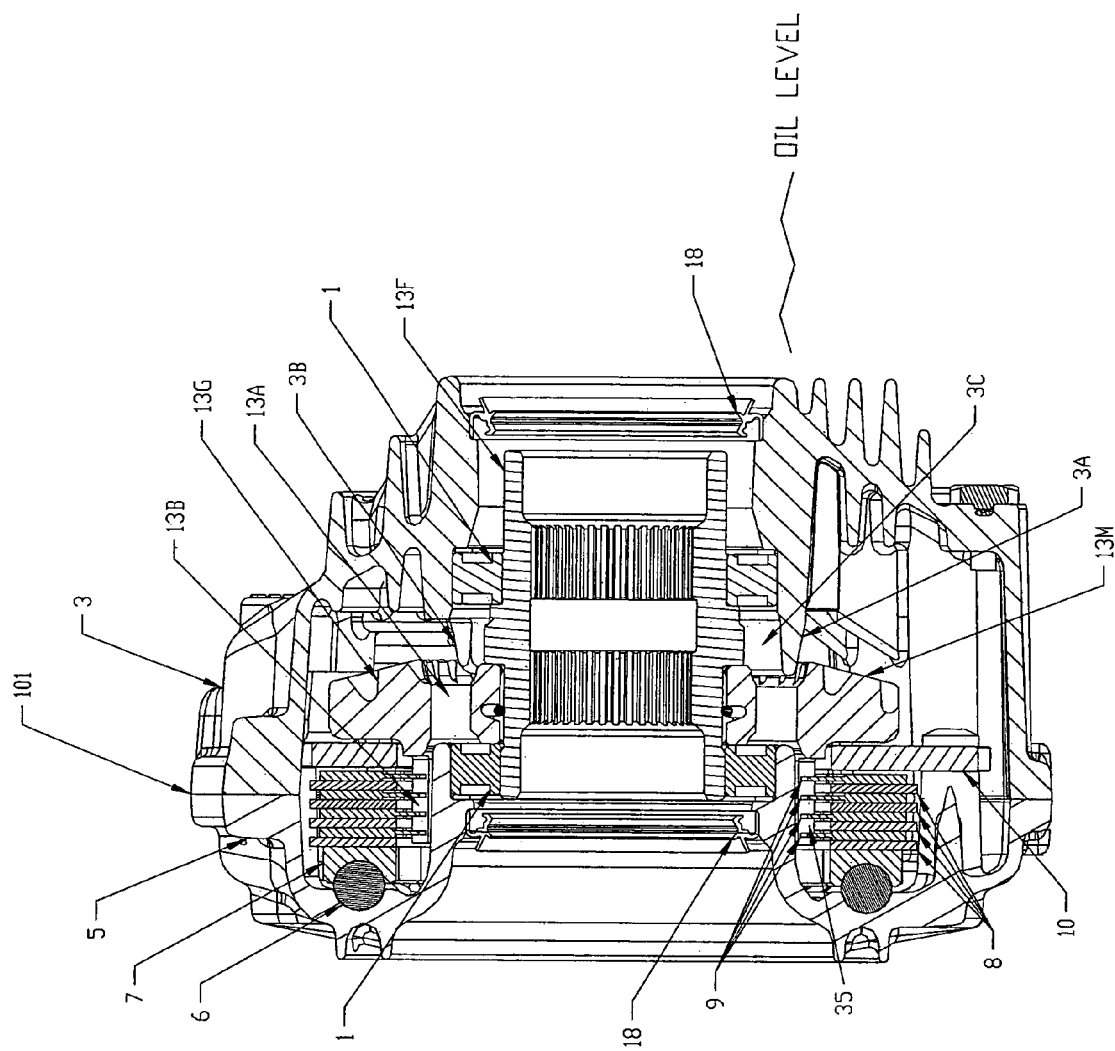
FIG. 3 is a cross-sectional view of the wet brake shown in FIG. 1, with the pinion and drive shafts, U-joint and CV joint, and their related parts, removed.
Figure 4:
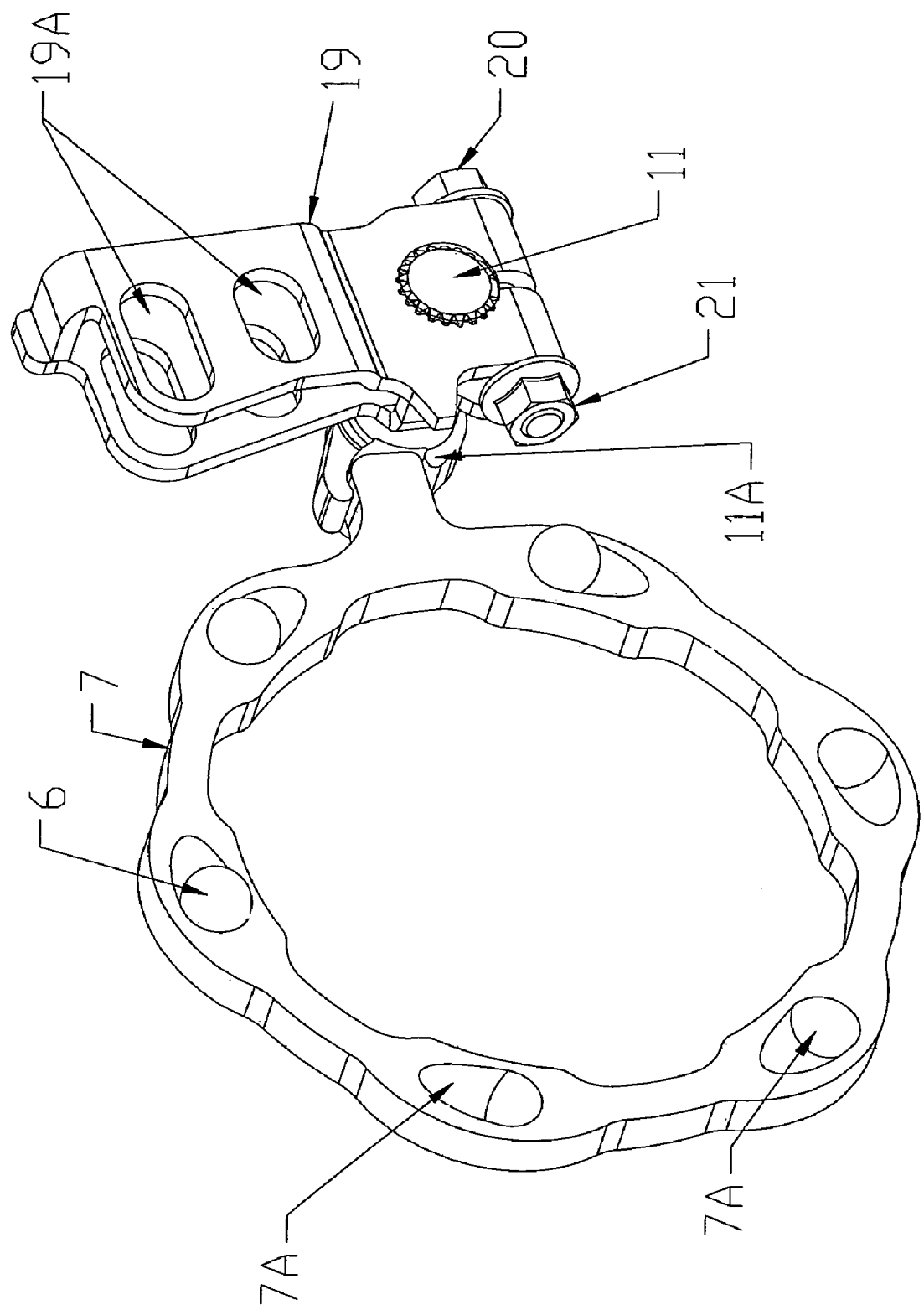
FIG. 4 is a perspective view of the ball ramp shown in FIG. 1.

A ring gear assembly 13 includes a ring gear 13G mounted on a shaft 13F. The shaft has a first end 13C that is supported in a bearing 1, which is in turn positioned in the case 3. A second end 13D of the shaft 13F is also supported in another bearing 1 which is positioned in the cover 5. The ring gear 13G has a plurality of teeth 13E around its periphery. The teeth 13E of the ring gear 13G mesh with the teeth of the pinion 29. A plurality of towers 13B are operatively connected to the ring gear and extend radially outward. A pressure plate 10 is attached rigidly to the cover 5 by screws 24 and 25. This connection locks the pressure plate 10 to the cover 5 rigidly and does not allow it to move more than the clearance in the bolt holes in the pressure plate 10. A plurality of reaction plates 8 are attached to the cover 5 via spacers 28 and screws 24. These spacers 28 and screws 24 will not allow the reaction plates 8 to rotate. They will however allow the reaction plate 8 to slide up and down along the spacers 28. A plurality of friction plates 9 are attached through notches 9A to the ring gear assembly 13 via the towers 13B. This connection makes the friction plates 9 rotate with the ring gear 13 while allowing them to move axially up and down the towers 13B. When the ball ramp 7 moves to the right, as shown in FIG. 3, a clamping force is created and is resisted by the pressure plate 10. It is shown that the reaction plates 8 and friction plates 9 alternate. This is a common arrangement, however it is noted that other arrangements may also be incorporated.

Referring now, especially to FIGS. 6 and 7, the friction plate 9 is in the general shape of a ring. Both sides of the ring 9 are formed with grooves 9B that extend generally radially outward. They extend from the inner diameter of the ring to the outer periphery of the outer diameter of the ring. The reaction plates 8 are also in the general shape of a ring and are adapted and configured to contact the friction plate 9 to provide for a braking action.

To drive a vehicle utilizing the present invention, rotational power is put into the pinion 29 by a U-joint 33. This pinion 29 is mated with the teeth 13E of ring gear 13G that rotates when the pinion 29 rotates. Power is transmitted from the ring gear 13G to the tires by a CV joint 34 which is connected to the drive shaft 22. The pinion 29 and ring gear assembly 13 are supported by bearings 1 and 2 that allow them to rotate freely. The bearings 1 and 2 are supported by bores in the main case 3 and cover 5. This gear case or housing defines a sump and holds oil in the bottom portion thereof. This oil lubricates and cools the inner workings of the gear case and the brake. The oil is kept in by seal 17 that seals on U-joint 33 and seals 18 that seal on the CV joints 34. To stop this vehicle, the wet brake system is activated. The braking process is as follows. The cable, previously discussed but not shown, goes into a hole 5A and the cover 5. The bell crank 19 is rigidly attached to the brake shaft 11. The brake shaft 11 is held in position by the bores in the case 3 and cover 5. It cannot change its position but can rotate in these bores. As the cable is pulled by the hand lever or foot brake lever the bell crank 19 rotates. Since the bell crank is rigidly attached to the brake shaft, it also rotates. The lever 7B of the ball ramp 7 mates with the lever 11A on the brake shaft 11. As the brake shaft 11 rotates, the lever 11A on it rotates the lever 7B on the ball ramp 7. The ball ramp 7 has helical track in it. The tracks are at relatively the same diameter as the ball pockets in the cover 5. The ball bearings 6 that sit in these ball pockets on one side and sit in the helical tracks 7A on the ball ramp 7 on the other side. As the ball ramp rotates, the helical tracks 7A move against the ball 6 and the ramp 7 lifts away from the cover 5. This motion takes up the clearance between the friction plates 9 and reaction plates 8. As the clearance is taken up between them, a clamping force is created between the ball ramp 7 and the pressure plate 10. In doing so, this takes all the running clearances between the friction plate 9 and reaction plates 8 and the friction plates 9 and reaction plates 8 are squeezed together. Since the friction plates 9 are connected to the ring gear assembly they want to continue to rotate with the ring gear 13. Since the reaction plates 8 are connected to the cover 5 and pressure plate 10, they do not want to rotate. This compressive force created by the ball ramp 7 and pressure plate 10 squeeze the friction plates 9 and reaction plates 8 together and create a friction braking force between these plates. This braking force stops or slows the vehicle. The braking system thus far described is again exemplary of one braking system that may be utilized with the present invention. Spring 14 provides a biasing force to spread the pack back apart after pressure is released.

Figure 2:
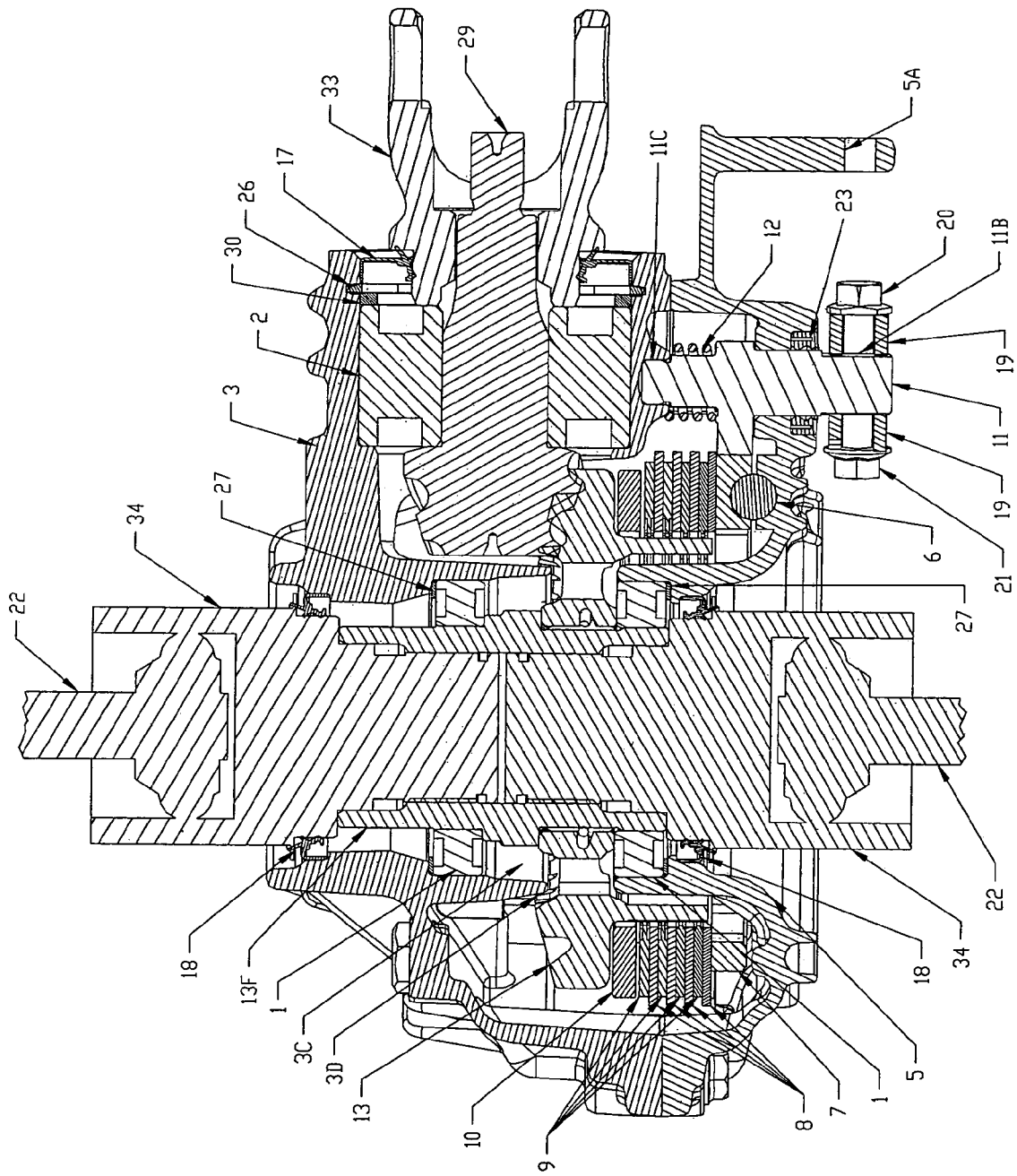
FIG. 2 is a cross-sectional view of the wet brake system shown in FIG. 1.
Figure 5:
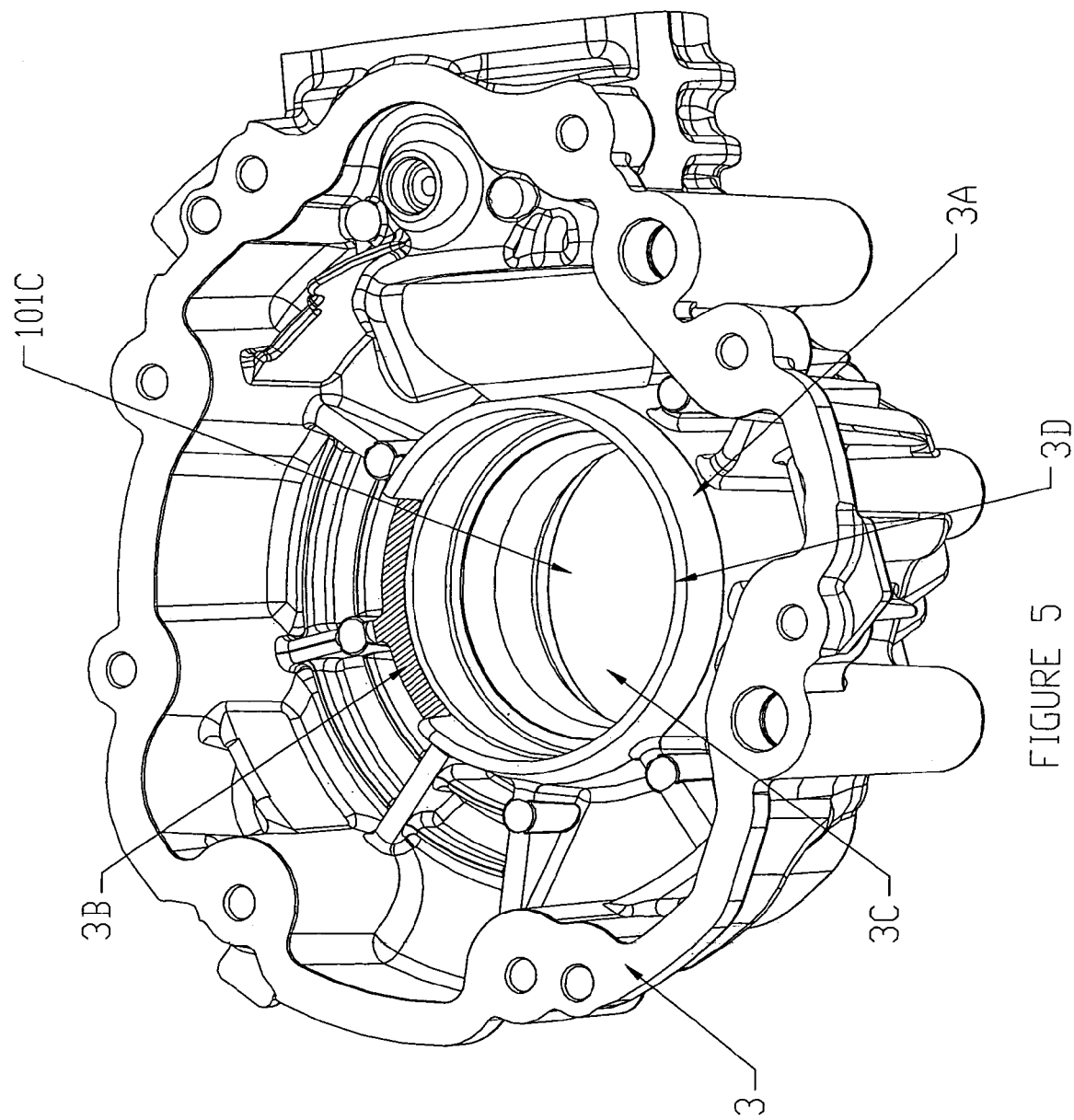
FIG. 5 is a perspective view of the case shown in FIG. 1, showing the rib used to channel and accumulate oil.

In the present invention, the friction plates have a design as shown in FIGS. 6 and 7. The grooves 9B may take other configurations as long as they provide fluid communication from the inner bore of the friction plate 9 to the outer circumference. Referring now to FIG. 5, along with the cross-section shown in FIGS. 2 and 3, an oil accumulation area 3C is created by the use of a rib 3A. The rib 3A is generally in the shape of a circular sleeve. One end 3D is positioned proximate a first side 13M of the ring gear 13G. The sleeve extends to and terminates proximate the seal 1. However, the rib 3A does not extend a full 360 degrees. Proximate what would be the top of cylinder, the rib 3A is not continuous. This creates an oil flow opening 3B which allows oil to flow into the oil accumulation area 3C, as will be more fully described hereafter. It can therefore be seen that the oil accumulation area 3C is defined by the rib 3A and at its ends by a first end of the ring gear 13 and its other end the bearing 1. As will become evident, one end of the oil accumulation area 3C needs to be proximate the ring gear 13G. However, the other end that is defined by the bearing 1 could have other areas that define that end. A plurality of openings 13A are formed in the ring gear 13G. The openings 13A extend from the first side 13M to the second side 13N. The openings 13A may be holes or slots or other suitable openings. However, the openings 13A must be in fluid communication with the oil accumulation area 3C. The reaction plates 8 and friction plates 9 have a central bore opening. The central bores are inside of the towers 13B and the holes 13A are also inside of the towers 13B. Therefore, the holes 13A are also in fluid communication with that area defined by the central bores of the reaction plates 8 and friction plates 9. A shim assembly 27, well known in the art, is used for adjusting backlash.

With the present invention, the stopping or slowing of a vehicle creates heat that is put into the brake pack. To cool the brake pack oil is circulated between them. The grooves 9B on the friction plates 9 allow oil to flow between the friction plates and reaction plates. As the oil moves between the plates 8 and 9, heat energy is transferred from the plates to the oil. The oil exiting the brake system is therefore warmer than when it enters the brake system. The warm oil then comes in contact with the aluminum case 3 and cover 5 and transfers the heat to the aluminum which then transfers it to the air.

In many other applications in the prior art, oil is circulated through the brake pack with a pump. With the present invention, the bottom portion of the ring gear 13 rotates in the oil sump defined by the lower portion of the cavity of the housing 101. As the ring gear rotates, the teeth 13E on the outer circumference move through the oil and bring oil up with the teeth 13E as the ring gear rotates. Then, due to gravity, the oil comes off of the ring gear 13 as it approaches the top of the gear case. This oil then drops through the oil flow opening 3B in the gear case 3. The clearance between the circular rib 3A and the first side 13M of the ring gear 13G is kept small so less oil will flow out through this clearance area than will flow into the accumulation area 3C from the ring gear. Again, the accumulation area 3C is defined as the volume between the shaft 13F and the inner surface of the rib 3A and at its ends by bearing 1 and side 13M of the ring gear 13G. The slots or holes 13A in the ring gear 13G allow oil to flow from the accumulation area 3C to the central bore and area defined by the central bores of the plates 8 and 9. Since more oil flows into the accumulation area 3C than flows out through the clearance area between the rib 3A and the ring gear 13G, oil will flow through the slots or holes 13A into the ring gear 13 and then into the inner portion 35 of the brake pack. Again, in this brake area, there are small clearances that limit the amount of oil that can freely flow around the brake system and back to the sump. Centrifugal force will then pull the remaining oil in the inner portion 35 of the brake system through the grooves 9B in the friction plate 9, thereby pulling the heat out of the brake pack and into the oil. Oil stamping 32 acts as a baffle to prevent spilling of oil out of a vent tube in the housing 101.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A brake system for use in a vehicle, the brake system comprising:
    a) a housing defining a cavity, the bottom of the cavity forming a sump for oil;
    b) a ring gear, having an outer circumference, rotatably mounted in the housing, the ring gear having a first side and a second side;
    c) a member forming an oil accumulation cavity, the member proximate the first side of the ring gear and extending outward, away from the second side;
    d) the member having an opening proximate its top, the opening for receiving oil from the ring gear as the ring gear rotates in oil;
    e) the ring gear having a plurality of teeth, wherein when the teeth rotate through the oil in the sump, oil is brought up by the ring gear and teeth and then falls, by force of gravity, into the oil accumulation cavity;
    f) the ring gear having an aperture from the first side to the second side, the aperture in fluid communication with the oil accumulation cavity;
    g) at least one reaction plate and one friction plate positioned proximate the second side of the ring gear, the plates having a central bore; and
    h) the aperture in fluid communication with the central bores, wherein oil in the accumulation cavity moves through the aperture to the central bores.

2. The brake system of claim 1, wherein one of the plates have a plurality of grooves, the grooves in fluid communication with the central bores.

3. The brake system of claim 2, wherein the grooves extend to an outer periphery of the plate.

4. The brake system of claim 3, wherein the one of the plates is a friction plate.

5. A brake system for use in a vehicle, the brake system comprising:
    a) a housing defining a cavity, the bottom of the cavity forming a sump for oil;
    b) a ring gear, having an outer circumference, rotatably mounted in the housing;
    c) a member forming an oil accumulation cavity;
    d) the member having an opening proximate its top, the opening for receiving oil from the ring gear as the ring gear rotates in oil;
    e) the ring gear having a plurality of teeth, wherein when the teeth rotate through the oil in the sump, oil is brought up by the ring gear and teeth and then falls, by force of gravity, into the oil accumulation cavity;
    f) at least one reaction plate and one friction plate positioned proximate the ring gear, the plates having a central bore; and
    g) the oil accumulation cavity in fluid communication with the central bores, wherein oil in the accumulation cavity moves through the aperture to the central bores.

6. The brake system of claim 5, wherein one of the plates have a plurality of grooves, the grooves in fluid communication with the central bores.

7. The brake system of claim 6, wherein the grooves extend to an outer periphery of the plate.

8. The brake system of claim 7, wherein the one of the plates is a friction plate.

* * * * *

UNITED STATES PATENT AND TRADEMARK OFFICE
CERTIFICATE OF CORRECTION

PATENT NO.       : 7,604,097 B2                                    Page 1 of 1
APPLICATION NO.  : 11/495145
DATED            : October 20, 2009
INVENTOR(S)      : Younggren et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 348 days.

Signed and Sealed this

Fifth Day of October, 2010

David J. Kappos
*Director of the United States Patent and Trademark Office*